United States Patent [19]
Busch, Jr.

[11] 3,864,294
[45] Feb. 4, 1975

[54] GELLED COATING COMPOSITIONS AND METHOD OF MAKING SAME

[75] Inventor: Francis W. Busch, Jr., Clinton, Ohio

[73] Assignee: Chesebrough-Pond's, Inc., Greenwich

[22] Filed: Nov. 2, 1972

[21] Appl. No.: 303,084

[52] U.S. Cl.............. 260/28.5 A, 106/28, 106/31, 106/266, 106/271, 106/272, 106/289, 106/290, 106/300, 106/308 B, 106/308 N, 117/240, 260/18 R, 260/28, 260/29.1 R, 260/37, 424/61

[51] Int. Cl.. C08c 11/70, C08f 45/52, C09d 11/12, C08h 9/06, A61k 7/04

[58] Field of Search............ 106/20, 32, 22, 23, 31, 106/290, 308 N, 271, 272, 308 B, 270, 266, 289, 300, 308 Q; 260/28, 28.5 A, 29.1 R, 37 R; 117/240; 424/61

[56] References Cited
UNITED STATES PATENTS

| | | | |
|---|---|---|---|
| 2,754,219 | 7/1956 | Voet et al. | 106/32 |
| 3,123,488 | 3/1964 | Lindlaw | 106/271 |
| 3,407,160 | 10/1968 | Frank | 106/271 |
| 3,422,185 | 1/1969 | Kuritzkes | 106/308 N |
| 3,503,882 | 3/1970 | Fitch | 106/290 |

Primary Examiner—Joseph L. Schofer
Assistant Examiner—T. S. Cron
Attorney, Agent, or Firm—Morgan, Finnegan, Durham & Pine

[57] ABSTRACT

Coating compositions in the form of a gel capable of being broken up for application to a suitable substrate by application of a relatively small shearing force at a relatively small shearing rate. The coating composition of this invention employs a rheological control system comprising an amine-modified montmorillonite clay, a swelling agent therefore, and a nonvolatile oleaginous agent for wetting the clay. The invention is particularly adapted for pigment-containing coating systems.

10 Claims, No Drawings

GELLED COATING COMPOSITIONS AND METHOD OF MAKING SAME

This invention relates to an improved coating composition (e.g., nail polish enamel, paint, ink, etc.) which utilizes a rheological control system wherein the resulting composition is in the form of a gel whose structure is such that it can be broken up for application to a suitable substrate upon the application to the gel of a relatively small shearing force at a relatively small shearing rate.

Of particular interest are pigment-containing coating compositions wherein the rheological control system serves not only to obtain a gel having the above-described characteristics but also serves as a pigment-suspending agent to provide pigmentsuspended coating compositions.

As will be apparent from the detailed discussion of the invention which follows, in forming the coating composition of this invention, there is employed, in addition to the components conventionally employed such as film-former, plasticizers, solvents, etc., a rheological control comprising: (1) a gelling agent which is an amine-modified montmorillonite clay; (2) an agent capable of effecting a swelling of the aforedescribed clay [e.g., polar compounds like those disclosed in U.S. Pat. No. 3,422,185 to Kuritzkes, phosphoric acid (e.g., ortho phosphoric, meta phosphoric acid), etc.]; and (3) a non-volatile oleaginous wetting agent having polar groups and an affinity for wetting the clay (and also for wetting the pigment if the coating composition is pigment-suspended) selected from the group consisting of oils, waxes and mixtures thereof. The aforementioned clay, swelling agent therefor, and wetting agent are incorporated in the coating composition in amounts so that resulting coating composition is in the form of a gel capable of being broken up by a relatively small shearing force at a relatively small shearing rate for application to a suitable substrate.

The present invention is particularly adapted for pigment-suspended coating compositions wherein the pigment is of a relatively high density which is generally in a range of 1.0 grams per cubic centimeter to 10.0 grams per cubic centimeter and preferably 2.5 grams per cubic centimeter to 4.5 grams per cubic centimeter. Examples of such pigments are: titanium dioxide (3.90 g/cc), bismuth oxychloride (9.50 g/cc), zinc oxide (5.7 g/cc), iron oxide (5.1 g/cc), talc (2.8 g/cc), Iron Blue (1.8 g/cc), FD&C Yellow Al Lake (1.9 g/cc), FD&C Red 3 Al Lake (2.32 g/cc), and FD&C Blue 1 Al Lake (1.73 g/cc).

Prior to the present invention, it was known to use thixotropes in coating compositions, particularly for providing suspensions of pigments in a suitable vehicle. For example, thixotropes of the type exemplified by organic amine-modified montmorillonite clays provide pigment suspension in various coating compositions and modifications are available which allow their use in a wide range of solvents of various polarity. These clays are used to suspend pigment in coatings where method of applications is a paint brush or roller or high-pressure spray gun. These application tools apply enough force to the gel structure developed by the clay to break it down, making paint easy to apply. The shear rates generated by a paint brush generally run from five thousand to twenty thousand reciprocal seconds.

Clay type thixotropes of the type mentioned above are effective as suspending agents in nail enamel compositions wherein the pigment is of the platelet type. Nail enamel compositions of the aforedescribed type are disclosed in the U.S. Pat. No. to Kuritzkes 3,422,185. The clay type thixotropes are not effective by themselves; however, in nail compositions for suspending pigments of the typical non-platelet type (e.g., titanium dioxide) for the reason that the amount that would be required to effectively suspend such pigment would result in a gel of such high strength that the force required to break it down far exceeds that which could be exerted through a nail polish brush.

In the prior art coating compositions containing pigments of the higher density type and employing organic aminemodified clay type thixotrope as an effective suspending agent, the nature of thixotrope and amounts thereof are such that the resulting prior art gel compositions are such that a relatively high shear rate (e.g., substantially above 4000 reciprocal seconds) is required to break down the gel structure for application to a suitable substrate in the form of a liquid suspension of a pigment.

Thixotropes utilizing oleaginous waxy materials of the type used in accordance with this invention have been used effectively as a pigment-suspending agent by the paint industry. (Examples are described in U.S. Pat. No. 3,407,160 to Frank.) They offer good pigment suspension with lower viscosity increases than clay type thixotropes. These waxes are used in products employing a solvent system of weak solvent power. As the polarity and solvent activity are increased, the effectiveness of wax type thixotropes decreases. It has been speculated that these thixotropes, when undissolved or partially dissolved, form a network of bridge-like structures which hold up pigment. As the polarity and solvent activity are increased, this bridge-like network is dissolved to the point where it no longer supports pigment.

In the prior art coating compositions containing pigments of the higher density type and employing a wax type thixotrope, the nature of thixotrope and amounts thereof are such that the resulting prior art gel compositions are such that a relatively high shear rate (e.g., substantially above 1000 reciprocal seconds) is required to break down the gel structure for application to a suitable substrate in the form of liquid suspension of a pigment.

These prior art coating compositions employing a wax type thixotrope also require a solvent system that is of low solvent activity and usually low polarity for effective pigment suspension.

It is an object of this invention to provide a coating composition which is in the form of a gel which can be broken up by the application of a relatively small force at a relatively small shearing rate. It is a further object of this invention to provide pigment-suspended coating compositions in the form of a gel which can be broken up by application of a relatively small force at a relatively small shearing rate. It is a still further object of this invention to provide pigment-suspending coating compositions of the type described in the foregoing object, wherein the pigment is of a relatively high density.

It is still another object of this invention to provide a nail polish or enamel composition in the form of a gel which can be broken up by application of a force exerted by a nail polish brush. It is a still further object of this invention to provide pigment-suspended nail enamel gels which can be broken up by the application of a force exerted with a nail polish brush.

It is another object of this invention to provide non-aqueous paint compositions in the form of a gel which can be broken up by the application of small force with a paint brush or roller.

A still further object of this invention is to provide ink compositions in the form of a gel which can be broken up by the application of a small shearing force as exerted by an ink applicator.

It is a further object of this invention to provide aerosol coating compositions in the form of a gel which can be broken up by the application of a small force, such as that would be exerted by shaking the can.

As indicated earlier, it has been found that the objects of this invention may be realized by forming coating compositions employing a rheological control system comprising an aminemodified montmorillonite clay as a gelling agent, a swelling agent which serves to swell the clay and an oleaginous wetting agent for the clay.

In forming the coating compositions of this invention, various alternative procedures may be used.

In one alternative, all of the components of the coating composition (i.e., the three hereinbefore-described components of the rheological control system, the solvent, pigments if present, plasticizers and other conventional additives) are all mixed together and subjected to a vigorous mixing force to form the desired gel coating composition.

In a second and the preferred alternative procedure, the amine-modified montmorillonite clay and oleaginous wetting agent are mixed with a portion of the solvent and all or a portion of the pigment if present, and all or preferably a portion of the film-former. The resulting mixture is subjected to a vigorous mixing force (e.g., grinding, milling, etc.) to form a paste. The resulting paste is then added to the remaining conventional components of the coating composition with sufficient mild mixing to obtain homogenity, after which the swelling agent is added thereto to form the desired coating composition.

In the third alternative method, the three components of the rheological control system are mixed together and subjected to a vigorous mixing force (grinding, milling, etc.) to obtain a gelled paste. In the aforedescribed composition, if the oleaginous wetting agent is a wax, a portion of solvent should be present. This pase is then added to the remaining components of the coating composition and subjected to mild mixing to obtain the desired gel composition.

Examples of amine-modified montmorillonite clays useful in this invention are those described in U.S. Pat. No. 3,422,185 to Kuritzkes and are broadly described as follows:

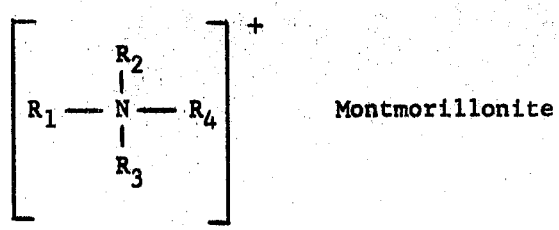

where $R_1$ is an alkyl group having at least 10 carbon atoms and up to 24 carbon atoms, and preferably having chain lengths of from 12 to 18 carbon atoms; $R_2$ is hydrogen, benzyl or an alkyl group of at least 10 carbon atoms and up to 24 carbon atoms, and preferably from 12 to 18 carbon atoms; $R_3$ and $R_4$ are each hydrogen or lower alkyl groups, viz., they contain carbon chains of from 1 to 4 atoms, and preferably are methyl groups.

The montmorillonite clay portion of these compounds may be derived from bentonite rock and have been chemically described by Berry and Mason in their book, Mineralogy, 1959, pp. 508–509. A synthetic form of montmorillonite may be used of similar chemical composition. Amine-modified montmorillonite clays of the type used in accordance with this invention are commercially available from the National Lead Company under the trade designation "Bentone" (e.g., Bentone 27, Bentone 34, Bentone 11-N, Bentone 38), and the Charles Pfizer Company, Easton, Penn., under the trade designation "Laponite."

Specific examples of quaternary amine-modified montmorillonite clays suitable for use in this invention are benzyl dodecyl dimethyl ammonium montmorillonite, sold commercially under the trade name "Bentone 27" and dimethyl dioctadecyl ammonium montmorillonite, sold commercially under the trade name "Bentone 38."

Specific examples of oils useful as the oleaginous wetting agent in accordance with this invention are unpolymerized castor oil (viscosity 2.75 stokes at 25°C., acid value 2, iodine value 86); polymerized castor oil (viscosity 11 stokes at 25°C., acid value 4, iodine value 80, sold commercially by Baker Castor Oil Company under the trade name "Pale 70"); polymerized castor oil (viscosity 32 stokes at 25°C., acid value 16, iodine value 70, sold commercially by Baker Castor Oil Company under the trade name "Pale 4"); polymerized castor oil (viscosity 250 stokes at 25°C., acid value 24, iodine value 56, sold commercially by Baker Castor Oil Company under the trade name "Pale 16"); polymerized castor oil (viscosity 500 stokes at 25°C., acid value 13, iodine value 63, sold commercially by Baker Castor Oil Company under the trade name "Pale 30"); polymerized castor oil (viscosity 2000 stokes at 25°C., acid value 12, iodine value 55, sold commercially by Baker Castor Oil Company under the trade name "Oil 50").

Examples of waxes useful as the oleaginous wetting agent in accordance with this invention are those described in U.S. Pat. No. 3,407,160 to Fred M. Frank:

The preferred modified oxidized waxes useful in the present invention are those having the following properties: melting point of about 180°F. to about 230°F., penetration of about 0 to about 7, saponification number of about 15 to about 65 and an acid number of about 5 to about 35. However, other modified oxidized waxes may also be employed. Preferably, the oxidized waxes are the Fischer-Tropsch waxes. Among the modified oxidized Fischer-Tropsch waxes which have been found particularly suitable as thixotropic and rheological-property-modifying agents are Petrolite C-7500, Petrolite C-8500 and Petrolite C-9500, all commercially available from Bareco Division, Petrolite Corporation. The properties of these waxes are as follows:

| Type | Melting Point, °F. | Penetration (ASTM D1321-57T) at 77°F. | Color ASTM D 1500 Max. | Acid No. | Saponification Number |
|---|---|---|---|---|---|
| Petrolite C-7500 | 205 – 215 | 1 – 3 | White | 10 – 15 | 25 – 35 |
| Petrolite C-8500 | 200 – 210 | 5 – 7 | Cream | 5 – 10 | 15 – 25 |
| Petrolite C-9500 | 190 – 200 | ¹7 | White | 25 – 35 | 45 – 60 |

¹Maximum.

As indicated earlier, the rheological control system used in accordance with this invention includes a swelling agent for amine-modified montmorillonite clay. Any known agent for this purpose may be used such, for example, as methyl alcohol 95 percent by weight - water 5 percent by weight; ethyl alcohol 95 percent by weight - water 5 percent by weight; propylene carbonate (see the published article: American Perfumer and Cosmetics, October, 1967). An especially useful swelling agent is ortho phosphoric acid which is ortho phosphoric acid 85 percent by weight - water 15 percent by weight. Ortho phosphoric acid is preferred because it can be used in very small amounts, e.g., 0.1 percent, and does not interfere with the other solvents or film-formers which may be required in part of formulation not involved with thixotrope.

An important aspect of this invention relates to nail enamels.

Nail enamels comprise a film-former, a solvent system for the film-former, and a plasticizer. They usually contain a pigment and often a resin.

The nail enamel compositions of this invention employ film-formers, solvent systems for the film-former, and plasticizers conventionally employed (and in amounts conventionally employed) in conventional nail enamel compositions such, for example, as those disclosed in the hereinbefore-mentioned U.S. Kuritzkes Patent No. 3,422,185 and the rheological control system described hereinbefore. If the nail enamel of this invention is pigmented, platelet type pigments may be used such as the nacreous pigments in amounts disclosed in U.S. Pat. No. 3,422,185 to Kuritzkes but the advantages of this invention are more readily apparent with high density non-platelet pigments.

If the nail polish of this invention contains a resin, any resin conventionally employed (and in amounts conventionally employed) in nail enamels it may be used as those disclosed in U.S. Pat. No. 3,422,185 to Kuritzkes.

As indicated earlier, an important feature of the nail enamels of this invention is the rheological control system described hereinbefore which also serves as a suspending agent if the nail enamel is pigmented. As indicated earlier, the rheological control system is of such nature and in such amounts that the resulting composition is in the form of a gel capable of being broken up by the shearing force exerted by a nail polish brush (100–200 dynes/cm².) at a shear rate of 200 reciprocal seconds.

In nail polish compositions of this invention, the amine-modified montmorillonite clay component is generally in an amount of 0.5 percent to 5.0 percent by weight of the total composition and preferably 0.8 percent to 2.0 percent by weight; the oleaginous wetting agent is generally in an amount of 0.05 percent to 5.0 percent by weight of the total composition and preferably 0.5 percent to 1.0 percent by weight; and, the amount of swelling agent depends upon which particular swelling agent is employed. For example, when the swelling agent is one well known to the art (methyl alcohol, ethyl alcohol, propylene carbonate) for this purpose conventional amounts (e.g., 0.2 to 0.5 parts swelling agent to 1 part clay) are used. It is known that with swelling agents of the aforementioned type, an amount of ⅓ by weight the amount of the clay gives good results. When ortho phosphoric acid is used as the swelling agent, it may be in an amount of 0.0001 percent to 00.1 percent by weight of the total composition and preferably 0.01 percent to 0.04 percent by weight.

The relative amount of clay component is generally in the range of .5 parts to 10 parts and preferably 3.5 to 1.0 parts of clay component per part of oleaginous wetting agent.

Examples of conventional film-formers useful in forming nail enamel compositions in accordance with this invention are: nitrocellulose ¼ second RS type (Hercules Chemical Co.); nitrocellulose ½ second RS type (Hercules Chemical Co.); nitrocellulose 5–6 seconds RS type (Hercules Chemical Co.); cellulose acetate butyrate ½ second (Eastman Chemical Co.); sucrose benzoate (Velisicol Products Chemical Co.); and ethyl cellulose N-10 (Hercules Chemical Co.). The film-former is in an amount conventionally used in nail enamel compositions such, for example, as 5.0 percent to 25 percent by weight of the total composition and preferably 8 percent to 12 percent by weight.

Examples of conventional solvent systems useful in forming nail enamel compositions in accordance with this invention are those described in the Kuritzkes U.S. Pat. No. 3,422,185. A typical conventional solvent system for nail polish composition is as follows:
  a. solvent — n-butyl acetate, n-amyl acetate and ethyl acetate;
  b. coupler or co-solvent — isopropanol and ethanol;
  c. diluent — toluene.

In general, the solvent system is in an amount 30 percent to 85 percent by weight of the total nail polish composition, and preferably 60 percent to 80 percent by weight.

Examples of conventional plasticizers useful in forming nail enamel compositions in accordance with this invention are camphor, dibutyl phthalate, dicotyl phthalate, triethyl citrate, acetyl triethyl citrate, tributyl citrate, acetyl tributyl citrate, acetyl tri-2-ethylhexyl citrate, tricresyl phosphate, and mixtures of any of the foregoing. In general, the plasticizer is in an amount equal to 10 percent to 20 percent by weight, and the relative amount of plasticizer is generally in the range of .2 to 1.5 parts per part of film-forming component, and preferably .5 parts to 1 part of plasticizer component to film-forming component.

Examples of conventional pigments useful in forming nail enamel compositions in accordance with this invention are titanium dioxide CTFA grade, cosmetic iron oxide M, cosmetic iron blue (ferric ferro cyanide), D&C yellow 5 Al lake, D&C Yellow 6 Al lake, D&C Red 7 Ca lake, D&C Red 7 Ca lake, D&C Red 6 Ba lake, D&C Red 35 Al lake, D&C Red 19, titanium dioxide coated mica, bismuth oxychloride coated mica, and pearl essence fish scale (quanine) platelets. In general, the pigment is in an amount of 0.01 percent to 10 percent by weight of the total composition, and preferably 0.05 percent to 3 percent by weight.

Examples of conventional resins useful in forming nail enamel compositions in accordance with this invention are sucrose acetate isobutyrate, polyvinyl butyrate, sucrose benzoate, methyl/butyl methacrylate, copolymer (Acryloid B-66), aryl sulfonamide ["Santolite MHP" (Monsanto) — this resin has a Specific Gravity of 1.35, a softening point of 62, and an acidity (mg. KOH/g.) of 1]; and, polyester resin ["Hercoflex 900" (Hercules) — this liquid polyester has a flash point (Cleveland open cup) of 238°C., a boiling point (at 1 mm.Hg.) of 180°C., and an Acid No. of 20–30].

In general, the resin is in an amount of 2 percent to 20 percent by weight of the total composition, and preferably 5 percent to 10 percent by weight.

In the discussion, the reference to "Examples" relates to coating compositions formed in accordance with this invention. The reference to "Experiments" relates to the preparation of coating compositions using prior art thixotrope systems. In the discussion in the Examples and the Experiments, reference to "percent" and "parts" refers to weight.

Example I described hereinafter represents a nail enamel utilizing the rheological control system used in accordance with the present invention. This example contains a film-former, solvent system, a plasticizer, a resin, pigments and the rheological control system.

In producing the nail polish of Example I, there is first produced Paste Composition A which is ultimately mixed with a pigmented lacquer base composition described hereinafter. As will be shown hereinafter, to the Paste A, pigmented lacquer base mixture is added the swelling agent to give the final coating composition.

Paste Composition A is formed by adding to 70.1 parts by weight of a solvent (30.0 parts butyl acetate - 8.1 parts ethyl acetate - 32.0 parts toluene) the following: (a) 7.5 parts of an amine-modified clay (dimethyl dioctadecyl ammonium montmorillonite clay); (b) 6.5 parts of "MPA 60 Toluene" - 1.6 parts MPA4.9 parts toluene (the oleaginous wetting agent which is sold by Baker Castor Oil Company and is a 24 percent by weight dispersion in toluene of mixed oxidized polyethylene modified wax (e.g., of the type known commercially as "Petrolite C-7500"); (c) 3.0 parts by weight of titanium dioxide CTFA grade; (d) 13.0 parts by weight film-former being nitrocellulose ½ second (70 percent by weight) wet with isopropyl alcohol 30 percent by weight. All ingredients are mixed by stirring and then processed through a sealed sand mill to subject it to vigorous mixing.

The composition is ground until a temperature of 150°F. is obtained. This temperature may vary from 120°–180°F.

A Lacquer Base A is formed by mixing the following components: 2.5 parts camphor, 4.5 parts dibutyl phthalate, 29.1 parts butyl acetate, 8.0 parts ethyl acetate, 30.9 parts toluene, 7.4 aryl sulfonamide resin (Santolite Resin M.S. 80), 12.3 parts nitrocellulose ½ sec. on a dry basis and 3.1 parts nitrocellulose ¼ second on a dry basis. The aforementioned nitrocellulose products consist of 70 percent by weight nitrocellulose - 30 percent by weight isopropyl alcohol so that there is present 2.2 parts isopropyl alcohol. To 5 parts by weight of the Lacquer Base are added 0.6 parts D.C. Red 6 Al lake, 0.0002 parts of iron blue and 0.05 cosmetic oxide and the resulting mixture is vigorously mixed in a mill. The resulting composition is then added to the remaining portion of the Lacquer Base to give pigmented Lacquer Base.

Twenty-three parts by weight of the hereinbefore described Paste Composition is added to 77 parts by weight of pigmented Lacquer Base composition with stirring. To this mixture is added 0.02 parts of ortho phosphoric acid (swelling agent) and the resulting composition. The formulation of the final coating composition of Example I is shown in Table I. In Table I, the numerical figures relate to parts by weight of the total composition.

In Table I which follows, in addition to Example I, there are disclosed formulations, referred to as Experiment Nos. II – V for coatings which do not embody the principles of this invention. In these experiments, the rheological control systems are those known to the art.

With respect to Experiments II to V, the same general procedure used for producing the composition of Example I was employed.

Experiment II relates to a coating composition wherein the rheological control system comprises a wax thixotrope.

Experiment III relates to a coating composition wherein the rheological control system comprises an amine-modified clay with ortho phosphoric acid as a swelling agent.

Experiment IV is the same as Experiment III except that ethyl alcohol is used as the swelling agent.

Experiment V is similar to Experiment III except the level of amine-modified clay is higher.

TABLE I

|  | Example I | Experiment II | Experiment III | Experiment IV | Experiment V |
|---|---|---|---|---|---|
| Camphor | 2.1 | 2.1 | 2.1 | 2.1 | 2.1 |
| Dibutyl Phthalate | 4.6 | 4.6 | 4.6 | 4.6 | 4.6 |
| Butyl Acetate | 28.2 | 28.2 | 28.2 | 28.2 | 28.2 |
| Ethyl Acetate | 8.0 | 8.0 | 8.0 | 8.0 | 8.0 |
| Isopropyl Alcohol | 6.81 | 6.81 | 6.81 | 6.81 | 6.81 |
| Toluene | 29.06 | 29.06 | 29.06 | 29.06 | 29.06 |
| Nitrocellulose ½ Second R.S. | 9.8 | 9.8 | 9.8 | 9.8 | 9.8 |
| Nitrocellulose ¼ Second R.S. | 2.2 | 2.2 | 2.2 | 2.2 | 2.2 |
| Aryl-Sulfonamide Resin M.S. 80[3] | 5.2 | 5.2 | 5.2 | 5.2 | 5.2 |
| Dimethyl Dioctadecyl Ammonium Montmorillonite[1] | 1.8 | — | 1.8 | 1.8 | 3.0 |
| Mixed Oxidized Polyethylene Modified Wax as Described in Paste A[2] | .40 | .40 | — | — | — |
| Cosmetic Oxide | .05 | .05 | .05 | .05 | .05 |
| Iron Blue | .0002 | .002 | .002 | .002 | .002 |

TABLE I — Continued

|  | Example I | Experiment II | Experiment III | Experiment IV | Experiment V |
|---|---|---|---|---|---|
| Titanium Dioxide | .80 | .80 | .80 | .80 | .80 |
| D&C Red No. 6 Al | .06 | .06 | .06 | .06 | .06 |
| Orthophosphoric Acid N.F. 85% | .02 | — | .02 | — | — |
| Ethyl Alcohol 95.0% ETOH 5% Water | — | — | — | .5 | 1.0 |

[1] Bentone 38 as supplied by NL Industries.
[2] This wax is described in U.S. Patent No. 3,407,160 to Fred M. Frank. A commercial dispension of this wax is sold by the Baker Castor Oil Company, Bayonne, New Jersey, under the trade name "MPA 60 - Toluene" and was used in this example. The toluene portion of this sample is included in the toluene designation in the Table.
[3] As supplied by Monsanto Company, St. Louis.

The nail enamel composition of Example I has a gel structure whereby the gel may be broken down by a shearing force normally exerted by a nail polish brush. The pigment has remained suspended now for over a year.

While the present invention is not limited action, it may be said that the system with respect to the wax component exemplified by Example I is quite different from that existing in prior art compositions whereby such wax is used as a thixotropic agent for suspending paint pigments. In the prior art paint compositions, the wax is incorporated in systems wherein the wax is incorporated in a liquid (solvent) which is of low polarity and possesses little solvent activity for the wax component. In such prior art systems, the wax when undissolved or only partially dissolved forms a network of bridge-like structure which maintains the pigment in suspension. If one attempts to use a solvent whose polarity and solvent activity for the wax is too high, the solvent then dissolves the wax to the point whereby it no longer suspends pigment. The solvents of Example I are too active for wax type component to suspend the pigment by itself. This is demonstrated by Experiment II which depends only on prior art wax rather than thixotropes of this invention. In Experiment II, the pigment settles out almost immediately.

Nail polish formed in accordance with Experiments III and IV remain suspended for a short period of time (about 1 month.) After 1 month the white pigment (Titanium Dioxide) rapidly settles to the bottom of the bottle. This is in contrast to the coating of Example I wherein the pigment has remained suspended for over a year now.

When amount of clay is increased as it is in Experiment V, pigment is suspended for a longer period but polish becomes so thick that it can no longer be applied with a polish brush.

Other examples of nail enamels formed according to the present invention are now disclosed. The same general procedure used for forming the coating composition of Example I was used for the Examples which follow.

EXAMPLE II

| Paste Composition B | Parts by Weight |
|---|---|
| Butyl Acetate | 32.7 |
| Ethyl Acetate | 8.1 |
| Toluene | 30.5 |
| Acetyl Tributyl Citrate | 2.25 |
| Nitrocellulose ½ Second dry | 5.0 |
| Nitrocellulose 5–6 Second dry | 3.7 |
| Isopropyl Alcohol | 4.1 |
| Dimethyl Dioctadecyl Ammonium Montmorillonite (Bentone 38) | 7.5 |
| Polymerized Castor Oil (Viscosity 2000 stokes as previously described) | 3.0 |
| Titanium Dioxide | 3.0 |

EXAMPLE II-Continued

| Pigmented Lacquer Base B | Parts by Weight |
|---|---|
| Acetyl Tributyl Citrate | 9.2 |
| Butyl Acetate | 35.4 |
| Ethyl Acetate | 19.2 |
| Toluene | 21.75 |
| Nitrocellulose ½ Second dry | 9.3 |
| Nitrocellulose 5–6 Second dry | 1.8 |
| Isopropyl Alcohol | 3.06 |
| D&C Yellow No. 6 Al lake | .132 |
| D&C Red No. 6 Ca lake | .03 |

23.5 parts by weight of Paste Composition B are mixed with 76.5 parts pigmented Lacquer Base B. To the resulting mixture is added 0.02 parts ortho phosphoric acid to give the final coating composition of Example II which has the formulation in parts by weight:

| | |
|---|---|
| Butyl Acetate | 34.4 |
| Ethyl Acetate | 15.2 |
| Toluene | 19.8 |
| Acetyl Tributyl Citrate | 8.7 |
| Nitrocellulose ½ Second dry | 7.2 |
| Nitrocellulose 5–6 Second dry | 2.0 |
| Isopropyl Alcohol | 2.5 |
| Dimethyl Dioctadecyl Ammonium Montmorillonite (Bentone 38) | 1.76 |
| Polymerized Castor Oil (Viscosity 2000 stokes as previously described) | 0.78 |
| D&C Yellow No. 6 Al lake | .10 |
| D&C Red No. 6 Ca lake | .018 |
| Ortho Phosphoric Acid | .02 |
| Titanium Dioxide | 0.8 |

EXAMPLE III

| Paste Composition C | Parts by Weight |
|---|---|
| Butyl Acetate | 31.0 |
| Ethyl Acetate | 7.3 |
| Toluene | 35.0 |
| Camphor | 1.5 |
| Dibutyl Phthalate | .75 |
| Nitrocellulose ½ Second dry | 5.04 |
| Nitrocellulose 5–6 Second dry | 3.71 |
| Dimethyl Dioctadecyl Ammonium Montmorillonite (Bentone 38) | 7.5 |
| Mixed Oxidized Polyethylene Modified Wax | 1.56 |
| Unpolymerized Castor Oil | .42 |
| Titanium Dioxide CTFA Grade | 3.0 |
| Isopropyl Alcohol | 3.8 |

| Pigmented Lacquer Base C | Parts by Weight |
|---|---|
| Butyl Acetate | 29.1 |
| Ethyl Acetate | 8.0 |
| Toluene | 30.9 |
| Camphor | 2.5 |
| Dibutyl Phthalate | 4.5 |
| Nitrocellulose ½ Second dry | 12.24 |
| Nitrocellulose ¼ Second dry | 3.06 |
| D&C Red No. 7 Ca lake | .04 |
| D&C Red No. 6 Al lake | .11 |
| Pearl Essence Pigment Guanine Fish Scale | .44 |
| Aryl Sulfonamide Resin | 7.4 |
| Isopropyl Alcohol | 2.2 |

23.5 parts by weight of Paste Composition C are mixed with 76.5 parts Pigmented Lacquer Base C. To the resulting mixture is added 0.02 part ortho phosphoric acid to give the final coating composition of Example III which has the formulation in parts by weight:

| Butyl Acetate | 30.2 |
|---|---|
| Ethyl Acetate | 7.7 |
| Toluene | 27.9 |
| Camphor | 2.00 |
| Dibutyl Phthalate | 4.52 |
| Nitrocellulose ½ Second dry | 9.7 |
| Nitrocellulose 5-6 Second dry | .9 |
| Dimethyl Dioctadecyl Ammonium Montmorillonite (Bentone 38) | 1.76 |
| Mixed Oxidized Polyethylene Modified Wax | .40 |
| Unpolymerized Castor Oil | .10 |
| Titanium Dioxide CTFA Grade | .71 |
| Nitrocellulose ¼ Second dry | 2.00 |
| D&C Red No. 7 Ca lake | .03 |
| D&C Red No. 6 Al lake | .08 |
| Pearl Essence Pigment Guanine Fish Scale | .33 |
| Ortho Phosphoric Acid | .02 |

EXAMPLE IV

| Paste Composition D | Parts by Weight |
|---|---|
| Butyl Acetate | 33.0 |
| Ethyl Acetate | 6.2 |
| Toluene | 31.1 |
| Acetyl Tributyl Citrate | 2.3 |
| Nitrocellulose ½ Second dry | 4.7 |
| Nitrocellulose 5-6 Second dry | 3.4 |
| Isopropyl Alcohol | 3.0 |
| Dimethyl Dioctacecyl Ammonium Montmorillonite | 7.5 |
| Mixed Oxidized Polyethylene Modified Wax | .84 |
| Polymerized Castor Oil 2000 Stokes Viscosity | 3.0 |
| Titanium Dioxide CTFA Grade | 5.0 |

| Pigmented Lacquer Base D | Parts by Weight |
|---|---|
| Acetyl Tributyl Citrate | 9.2 |
| Butyl Acetate | 35.4 |
| Ethyl Acetate | 19.2 |
| Toluene | 21.75 |
| Nitrocellulose ½ Second dry | 9.30 |
| Nitrocellulose 5-6 Second dry | 1.80 |
| Isopropyl Alcohol | 3.3 |
| D&C Red No. 7 Ca lake | .02 |
| D&C Red No. 6 Ca lake | .03 |

23.5 parts by weight of Paste Composition D and 76.5 percent Pigmented Lacquer Base D and 0.02 percent ortho phosphoric acid to give the final composition as follows:

| Butyl Acetate | 34.0 |
|---|---|
| Ethyl Acetate | 16.1 |
| Toluene | 24.1 |
| Acetyl Tributyl Citrate | 7.59 |
| Nitrocellulose ½ Second dry | 8.22 |
| Nitrocellulose 5-6 Second dry | 2.1 |
| Isopropyl Alcohol | 4.0 |
| Dimethyl Dioctadecyl Ammonium Montmorillonite | 1.76 |
| Mixed Oxidized Polyethylene Modified Wax | .19 |
| Polymerized Castor Oil 2000 Stokes Viscosity | .705 |
| Titanium Dioxide CTFA Grade | 1.18 |
| D&C Red No. 7 Ca lake | .018 |
| D&C Red No. 6 Ca lake | .020 |
| Ortho phosphoric Acid | .02 |

PAINT COMPOSITION

Another aspect of this invention pertains to nonaqueous paint compositions. The paint compositions comprise a film-former, a solvent system for the film-former or resin and a pigment. In addition, they may contain a plasticizer or a drier; or both. The paint compositions of this invention employ film-formers, solvent systems for the film-formers and pigments conventionally employed (and in amounts conventionally employed) in conventional paint compositions such, for example, as those disclosed in Outlines of Paint Technology, W. M. Morgans, published by Griffin Publishing Co., London, England (1969), or also U.S. Pat. No. 3,407,160 to Frank; and a rheological control agent of the type used in accordance with this invention. If a plasticizer and/or a resin is used, any conventional plasticizer or resin conventionally used in known paint compositions may be employed such as those disclosed in Sward & Gardner Paint Testing Manual, Thirteenth Edition, 1972, or the above-cited references. As indicated above, an important component of the paint compositions of this invention is the rheological control agent. This agent serves as as suspending agent for the pigment and the resulting composition is in the form of a gel capable of being broken up by the application of a shearing force (e.g., 200–400 dynes/cm$^2$) at a shearing rate exerted by a paint brush (e.g., 3000–5000 reciprocal seconds).

Examples of suitable rheological control agents useful in the manufacture of paint compositions in accordance with this invention are: aforementioned amine-modified montmorillonite clay, swelling agent therefor and non-volatile oleaginous oil or wax. In embodiments of the aforementioned type, the rheological agent is generally in the amount of 0.5 to 7.5 percent by weight of the total composition, and preferably 0.5-2 percent by weight.

Examples of conventional film-formers or resins useful in paint compositions in accordance with this invention are: acrylics, alkyds and polyesters. Typical acrylics may be used such as methyl/butyl methacrylate as supplied by Rohm & Haas under the trade name "Acryloid B-66"; methyl methacrylate supplied under the trade name "Acryloid A-21"; polymethyl methacrylate as supplied by the DuPont Company under the trade name "Lucite 2041"; and polyethyl methacrylate as supplied by DuPont Company under the trade name "Lucite 2042". Examples of typical alkyds which may be employed are 30 percent soy oil in mineral spirits; glycerol phthalate and 45 percent soy oil in mineral spirits. A commercial example of alkyd vehicle is "Aroplaz 21" 1266 - M 70 supplied by Archer Danies Midland Co. An example of a polyester which may be used is "Vitel Resin PE100-X" as supplied by The Goodyear Company.

The film-former or resin is in an amount conventionally used in paint compositions such, for example, as 10 to 50 percent by weight of the total composition, and preferably 20 to 30 percent by weight.

Examples of conventional solvent systems useful in forming paint compositions in accordance with this invention are: acetone, acrylonitrile, sec-butyl acetate, n-butyl alcohol, n-butyl Carbitol, Cellosolve, Cellosolve acetate, diethyl ketone, ethyl acetate, ethyl alcohol, n-heptane, n-hexane, low odor mineral spirits, n-propyl acetate, toluene and VM & P naphtha.

The solvent system is in an amount of 10 to 50 percent by weight of the total composition, and preferably 10 to 30 percent by weight.

Examples of conventional pigments useful in forming paint compositions in accordance with this invention are: chromates, ferrocyanides, sulfides and sulfoselenides, and oxides. Examples of chromates which may be used are: chrome yellow-medium, chrome yellow-shading, and chrome orange-dark. Examples of ferrocyanides which may be used are iron blues and chrome green. Examples of sulfides and sulfoselenides which may be used are cadmium yellow lithopone, cadmium yellow, cadmium orange, and cadmium red and maroon. Examples of oxides which may be used are venetian red and cuprous oxide. The white oxides are titanium dioxide and zinc oxide.

In general, the pigment is an amount of 5 to 50 percent by weight of the total composition, and preferably 10 to 30 percent by weight.

Examples of conventional plasticizers useful in forming paint compositions in accordance with this invention are phthalates, phosphoric acid derivatives and glycol derivatives. Typical phthalates which may be used are di-isooctyl and di-ethyl. An example of a phosphoric acid derivative which may be used is tricresyl phosphate. Typical examples of glycol derivatives which may be useful are tri-ethylene glycol di-(2-ethyl butyrate), triethylene glycol di-(2-ethyl hexoate), and polyethylene glycol di-(2-ethyl hexoate.)

In general, the plasticizer is in an amount of .5 parts to 1.5 parts plasticizer to 1 part film-former.

The rheological control system is of such nature and in such amounts that the resulting composition is in the form of a gel capable of being broken up by shearing force exerted by a paint brush. Less than 200 dynes/cm² at a shear rate of 1000 reciprocal seconds.

The methods for preparing gelled paint compositions according to this invention are as indicated earlier.

EXAMPLE VI (Paint Composition 1)

| Titanium Dioxide Rutile | 35.0 |
| Odorless Mineral Spirits | 33.5 |
| Alkyd Resin Solution 40% Solids in Mineral Spirit | 30.0 |
| Dimethyl Dioctadecyl Ammonium Montmorillonite | .5 |
| Mixed Oxidized Polyethylene Modified Wax (MPA) | .5 |
| Lead Naphthenate 24% | .3 |
| Cobalt Naphthenate 6% | .2 |
| Ortho Phosphoric Acid | .05 |

All ingredients were mixed and ground through sand mill until pigment properly dispersed. The resulting gelled paint remained stable for six months.

EXAMPLE VII (Paint Composition 2)

| | Parts by Weight |
|---|---|
| Titanium Dioxide Rutile | 9.3 |
| Methyl Methacrylate 30% Solids | 32.7 |
| Cellulose Acetate | 10.0 |
| Acetone | 21.6 |
| Toluene | 21.6 |
| Butyl Benzyl Phthalate | 4.2 |
| Dimethyl Dioctadecyl Ammonium Montmorillonite (Bentone 38) | .42 |
| Polymerized Castor Oil Viscosity 2000 Stokes | .21 |
| Ortho Phosphoric Acid | .05 |

All ingredients were mixed and passed through sand mill until titanium dioxide dispersed.

INK COMPOSITIONS

Another aspect of this invention pertains to ink compositions. The ink compositions comprise a solvent, a pigment, and usually a film-forming component. In addition, they may contain a plasticizer or a resin, or both.

The ink compositions of this invention employ film-formers, solvent systems for the film-formers, and pigments conventionally employed (and in amounts conventionally employed) in conventional ink compositions, such for example as those discussed in Kirk Othmer, Encyclopedia of Chemical Technology (1970), Second Edition, and Printing Inks, Their Chemistry and Technology, Carleton Ellis, Reinhold Publishing Co., 330 West Forty-Second Street, New York, New York (1940), and a rheological control agent. If a plasticizer and/or a resin is used, any conventional plasticizer or resin conventionally used in known ink compositions may be employed such as those disclosed in Kirk Othmer, Encyclopedia of Chemical Technology, Second Edition. As indicated above, an important component of the ink compositions of this invention is the rheological control agent. This agent serves as a suspending agent for the pigment and the resulting composition is in the form of a gel capable of being broken up by the application of a shearing force exerted by an ink applicator (200 dynes/cm²).

Examples of suitable rheological control agents useful in the manufacture of gravure and flexographic ink compositions in accordance with this invention are: aforementioned combination of amine-modified clay, swelling agent therefor and non-volatile oleaginous material. In embodiments of the aforementioned type, the rheological agent is generally in the amount of 0.1 to 5 percent by weight of the total composition, and preferably 0.5 to 2.0 percent by weight.

Examples of conventional film-formers useful in ink compositions in accordance with this invention are: nitrocellulose ½ second S.S. type, nitrocellulose ½ second R.S. type, nitrocellulose ¼ second R.S. type, (Acryloid A-10) methyl methacrylate, (Acryloid B-66) methyl/butyl methacrylate copolymer, alcohol soluble polyamides, such as Vanamide 30-40 as supplied by the Vanderbilt Chemical Company, or Versamide 16-35 as supplied by the General Mills Chemical Company.

The film-former is in an amount conventionally used in ink compositions such, for example, as 20 to 40 percent by weight of the total composition, and preferably 25 to 25 percent by weight.

Examples of conventional solvent systems useful in forming flexographic and gravure ink compositions in accordance with this invention are: ethyl alcohol, methyl alcohol, proprietary alcohol 99 percent anhydrous, n-propyl alcohol, n-butyl alcohol, hexane, toluene, ethyl acetate 88 percent, n-propyl acetate, n-butyl acetate, acetone and methyl ethyl ketone.

The solvent system is in an amount of 20 to 50 percent by weight of the total composition, and preferably 25 to 35 percent by weight.

Examples of conventional pigments useful in forming ink compositions in accordance with this invention are: phthalocyanine blue, titanium dioxide, carbon black, chrome yellow (lead chromate), cadmium yellow, vermillion red (mercury sulfide), rhodamine, red lake C (color index pigment red 53:1, Cl 15585), methyl violet and phthalocyanine green.

In general, the pigment is in an amount of 10 to 40 percent by weight of the total composition, but varies according to the actual pigment used.

Examples of conventional plasticizers useful in forming ink compositions in accordance with this invention are: dibutyl phthalate, and dioctyl phthalate.

In general, the plasticizer is in an amount of 0.2 to 1.5 parts plasticizer to 1 part film-former, and preferably 0.7 to 1.0 parts of plasticizer to 1 part of film-former.

Examples of conventional resins useful in forming ink compositions in accordance with this invention are: polyvinyl butyrate, sucrose benzoate, aryl sulfonamide (Santolite resinMonsanto Co.), polyester resin (Hercoflex-900) previously described in examples of nail polish, shellac, etc.

As indicated earlier, an important feature of ink compositions of this invention is the rheological control system hereinbefore described which also serves as a suspending agent. The rheological control system is of such nature and in such amounts that the resulting composition is in the form of a gel capable of being broken by the shearing force exerted by ink application system. That is, the movement of type into ink pan and thereby transferring ink from pan onto rollers or other conventional application systems.

The method for forming gelled ink compositions according to this invention are the same as the three methods described earlier.

A suitable method is as follows: There is vigorously mixed in a suitable mill, a portion of solvent, pigment, and thixotrope (amine-modified montmorillonite clay, non-volatile oleaginous oil or wax) into a paste to form Ink Paste A. The above-described paste is then combined with remaining ink components and mixed until uniform. The swelling agent is then added and further mixed until uniform.

EXAMPLE VIII (Ink Paste A)
Mill Base Ink
Flexographic or Gravure

| | |
|---|---|
| Benzyl Dodecyl Dimethyl Ammonium Montmorillonite (Bentone 27) | 7.5 |
| Polyethylene Modified Wax Butanol (MPA 60) 60% Butanol, 40% Petrolite C-7500 | 6.5 |
| Nitrocellulose ½ second S.S. type | 7.0 |
| Titanium Dioxide | 15.0 |
| Ethyl Alcohol | 30.0 |
| Normal Butyl Acetate | 34.0 |

This is mixed and ground in sealed sand mill residence time 12 minutes and a temperature of 150°F. (120°F.–180°F.).

A dispersion of titanium dioxide in nitrocellulose lacquer is then prepared by combining the remaining conventional ink ingredients. Then grinding in a suitable mill to form a pigmented ink lacquer of the following composition:

PIGMENTED INK LACQUER A

| | |
|---|---|
| Nitrocellulose ½ second S.S. type | 7.0 |
| Dibutyl phthalate | 3.0 |
| Ethyl Alcohol | 30.0 |
| Ethyl Acetate | 30.0 |
| TiO$_2$ | 30.0 |

The ink composition of this invention is then formed by combining 23.5 percent by weight ink paste A with 76.5 percent by weight pigmented ink lacquer A and 0.04 percent ortho phosphoric acid as the swelling agent. The final composition is as follows:

FINAL INK COMPOSITION 1

| | |
|---|---|
| Benzyl Dodecyl Dimethyl Ammonium Montmorillonite | 1.75 |
| Mixed Oxidized Polyethylene Modified Wax | .61 |
| Nitrocellulose ½ second S.S. | 6.99 |
| Dibutyl Phthalate | 2.29 |
| TiO$_2$ | 26.42 |
| Ethyl Alcohol Anhydrous Denatured | 32.00 |
| Butyl Acetate | 8.00 |
| Ethyl Acetate | 22.90 |
| Ortho Phosphoric Swelling Agent | .04 |

The pigment has remained suspended for six months.

Other ink compositions according to this invention have been prepared as follows. The following ingredients were combined and then passed through sand mill.

EXAMPLE IX (Ink Composition 2)

| | |
|---|---|
| Phthalocyanine Blue | 15.0 |
| N-Propyl Alcohol | 30.0 |
| Polyamide Resin(Versamide 16–35) | 24.0 |
| Benzyl Dimethyl Ammonium Montmorillonite (Bentone 27) | 1.0 |
| Mixed Oxidized Polyethylene Modified Wax Dispersed in Butanol(MPA 60) | 1.0 |
| Narrow-Cut Varnish Makers and Printers Naphtha B.P. 245 to 290 | 29.0% |

AEROSOL COMPOSITIONS

Compositions of the type produced in accordance with this invention of the aerosol type are now described. The illustrative aerosol compositions are non-settling aerosol paint lacquers. More particularly, lacquers have been prepared using thixotrope of this invention by first formulating an adequate pigmented lacquer and then replacing a portion of the solvent with a propellant which is compatible with the solvent that is used which is generally in an amount of 30–60 percent by weight, and preferably 40–50.

The propellant can be any conventional propellant used in aerosol containers. These propellants include hydrocarbons, fluorocarbons, and compressed gases. Specific propellants include compressed air, nitrogen, carbon dioxide, $C_1$ to $C_5$ hydrocarbons, $Cl_3FC$, $Cl_3F_2C$ and any tetrafluoroethane. Of course, as is well known, conventional mixtures of propellants may be used.

Examples X–XII relate to aerosol lacquers of this invention.

In preparing the aerosol composition, there is first prepared a pigment lacquer. The pigmented lacquers for making the final compositions of Examples X, XI and XII, respectively, are shown in the table which follows. In the forming the lacquer compositions, the components shown are vigorously mixed in a sand mill.

| PIGMENTED LACQUER FORMULATION | | | |
|---|---|---|---|
| | Example X | Example XI | Example XII |
| Nitrocellulose ½ Second R.S. dry | 6.00 | 6.00 | |
| Isopropyl Alcohol | 2.60 | 2.60 | |
| Methyl-Butyl Methacrylate (Acryloid B-66) | 6.00 | 6.00 | 12.0 |
| Titanium Dioxide Rutile | 8.00 | 8.00 | 8.0 |
| Dibutyl Phthalate | 4.00 | 4.00 | 4.0 |
| Toluene | 10.00 | 10.00 | 10.0 |
| Ethyl Acetate | 10.00 | 10.00 | 10.0 |
| Butyl Acetate | 10.00 | 10.00 | 10.0 |
| Dimethyl Dioctadecyl Ammonium Montmorillonite | 1.75 | 1.75 | 1.75 |
| Mixed Oxidized Polyethylene Modified Wax (MPA 60) | 1.75 | | 1.75 |
| Polymerized Castor Oil Viscosity 2000 Stokes | | 1.75 | |

In preparing the aerosol compositions of this invention to 60.1 parts by weight of a lacquer composition of the type shown in the foregoing table is added 0.1 parts by weight of ortho phosphoric acid. The resulting composition is added to a conventional aerosol can.

| | |
|---|---|
| Trichlorofluoromethane (Freon 11) | 20.0 parts |
| Dichlorodifluoromethane (Freon 12) | 18.7 parts |

The propellent (e.g., a mixture of 20 parts by weight trichlorofluoromethane (Freon 11) and 18.7 parts by weight of dichlorodifluoromethane (Freon 12) is then added in the usual manner and the resulting combination is mixed by shaking can. Samples were prepared in glass aerosol containers so pigment settling could be observed. No settling occurred within four month observation period.

What is claimed is:

1. A coating composition in the form of a gel capable of being broken up for application to a suitable substrate by a relatively small shearing force at a relatively small shearing rate comprising a rheological control system comprising an amine-modified montmorillonite clay, a swelling agent therefor which is a phosphoric acid, a non-volatile oleaginous wetting agent having polar groups and an affinity for wetting the clay and a solvent system.

2. A coating composition according to claim 1 wherein there is present a pigment.

3. A coating composition according to claim 1 wherein there is present a pigment of a relatively high density.

4. A coating composition according to claim 1 wherein the oleaginous material is a mixed oxidized polyethylene modified wax.

5. A coating composition according to claim 1 wherein the phosphoric acid is orthophosphoric acid.

6. A coating composition according to claim 1 wherein the amine-modified montmorillonite clay is benzyl dodecyl dimethyl ammonium montmorillonite.

7. A coating composition according to claim 1 wherein the amine-modified montmorillonite clay is dimethyl dioctadecyl ammonium montmorillonite.

8. A coating composition according to claim 1 in which it is of the aerosol type.

9. A nail polish according to claim 1 wherein the amine-modified montmorillonite clay is dimethyl ammonium montmorillonite, the oleaginous material is a mixed oxidized polyethylene modified wax, and the swelling agent is orthophosphoric acid.

10. A coating composition in the form of a gel capable of being broken up for application to a suitable substrate by a relatively small shearing force at a relatively small shearing rate comprising a rheological control system comprising an amine-modified montmorillonite clay, a swelling agent therefor, a non-volatile oleaginous wetting agent having polar groups and an affinity for wetting the clay and a solvent system including an acetate solvent having solvent activity for the non-volatile oleaginous wetting agent.

* * * * *

UNITED STATES PATENT OFFICE
CERTIFICATE OF CORRECTION

Patent No. 3,864,294   Dated February 4, 1975

Inventor(s) Francis W. Busch, Jr.

It is certified that error appears in the above-identified patent and that said Letters Patent are hereby corrected as shown below:

Column 3, line 43, after the word "desired" insert -- gel --.

Column 3, line 50, change the word "pase" to -- paste --.

Column 8, line 23, after the word "Composition" add -- A --.

Column 8, line 27, after the word "composition" add -- is stirred. -- .

Column 15, line 28, change the word "method" to -- methods --.

Signed and sealed this 8th day of April 1975.

(SEAL)
Attest:

RUTH C. MASON
Attesting Officer

C. MARSHALL DANN
Commissioner of Patents
and Trademarks